(12) United States Patent
Yamagishi et al.

(10) Patent No.: US 10,944,137 B2
(45) Date of Patent: Mar. 9, 2021

(54) BATTERY COOLING DEVICE FOR ELECTRIC VEHICLE

(71) Applicant: HONDA MOTOR CO., LTD., Tokyo (JP)

(72) Inventors: Yosuke Yamagishi, Wako (JP); Michihisa Tsutsumi, Wako (JP); Manabu Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 50 days.

(21) Appl. No.: 16/384,226

(22) Filed: Apr. 15, 2019

(65) Prior Publication Data

US 2019/0319319 A1 Oct. 17, 2019

(30) Foreign Application Priority Data

Apr. 16, 2018 (JP) .............................. JP2018-078426

(51) Int. Cl.
  *H01M 10/6556* (2014.01)
  *H01M 10/613* (2014.01)
  (Continued)

(52) U.S. Cl.
  CPC ........... *H01M 10/6556* (2015.04); *B60K 1/04* (2013.01); *B60L 58/26* (2019.02); *H01M 10/613* (2015.04);
  (Continued)

(58) Field of Classification Search
  CPC ..... B60L 58/26; B60K 1/04; B60K 2001/005; B60K 1/00; B60Y 2306/01; F28F 9/0248;
  (Continued)

(56) References Cited

U.S. PATENT DOCUMENTS 4,407,269 A * 10/1983 Hopper .................... F15D 1/02
126/634
2009/0314474 A1* 12/2009 Kimbara ............... H01L 23/473
165/104.33
(Continued)

FOREIGN PATENT DOCUMENTS

DE 102015106948 A1 11/2016
EP 2945219 * 11/2015 .......... H01M 10/615
(Continued)

OTHER PUBLICATIONS

Extended European Search Report dated Jan. 15, 2020, issued in counterpart application No. 19165739.4. (7 pages).
(Continued)

*Primary Examiner* — Michael L Dignan
(74) *Attorney, Agent, or Firm* — Westerman, Hattori, Daniels & Adrian, LLP

(57) ABSTRACT

In a battery cooling device for an electric vehicle, a cooling medium supply piping and a cooling medium discharge piping are disposed in a fore-and-aft direction in a middle part in a vehicle width direction of a vehicle body. A plurality of cooling members extend toward opposite sides in the vehicle width direction from both the pipings. A cooling medium passage returns in an outer end part in the vehicle width direction of the cooling member. Therefore, when the vehicle is involved in a side collision, it becomes difficult for both the pipings to be damaged, and cooling medium is prevented from leaking. Also, the cooling medium flows by making a U-turn inside the cooling member, thereby enabling positions on outside and inside in the vehicle width direction of a battery to be cooled evenly.

4 Claims, 10 Drawing Sheets

COOLING MEDIUM JACKET ON FRONT SIDE

COOLING MEDIUM JACKET ON REAR SIDE

(51) Int. Cl.
*H01M 10/625* (2014.01)
*B60L 58/26* (2019.01)
*B60K 1/04* (2019.01)
*H01M 10/656* (2014.01)
*B60K 1/00* (2006.01)

(52) U.S. Cl.
CPC ....... *H01M 10/625* (2015.04); *H01M 10/656* (2015.04); *B60K 2001/005* (2013.01); *B60L 2240/545* (2013.01)

(58) Field of Classification Search
CPC .... F28F 3/12; H01M 10/6556; H01M 10/613; H01M 10/625; H01M 10/656; H01M 2/1077; H01M 2/1083; H01M 10/6554; H01M 10/6568; H01M 2220/20
See application file for complete search history.

(56) References Cited

U.S. PATENT DOCUMENTS

| | | | | |
|---|---|---|---|---|
| 2012/0121962 | A1* | 5/2012 | Katayama | H01M 10/613 429/120 |
| 2013/0078489 | A1* | 3/2013 | Kato | H01M 10/613 429/83 |
| 2013/0126140 | A1* | 5/2013 | Park | F28F 9/0273 165/173 |
| 2013/0183555 | A1* | 7/2013 | Boddakayala | H01M 10/647 429/72 |
| 2015/0086831 | A1* | 3/2015 | Haussmann | H01M 10/613 429/120 |
| 2016/0204486 | A1* | 7/2016 | Kenney | F28F 1/045 429/120 |
| 2018/0034119 | A1* | 2/2018 | Siering | H01M 10/6556 |

FOREIGN PATENT DOCUMENTS

| | | |
|---|---|---|
| EP | 2945219 A1 | 11/2015 |
| JP | 2012-138214 A | 7/2012 |
| JP | 2015-505142 A | 2/2015 |
| JP | 6064730 B2 | 1/2017 |
| JP | 2019-086183 A | 6/2019 |
| WO | 2017/025234 A1 | 2/2017 |
| WO | 2017/033412 A1 | 3/2017 |

OTHER PUBLICATIONS

Office Action dated Sep. 18, 2019, issued in counterpart JP Application No. 2018-078426, with English translation (10 pages).

* cited by examiner

COOLING MEDIUM JACKET ON FRONT SIDE

COOLING MEDIUM JACKET ON REAR SIDE

FIG.6
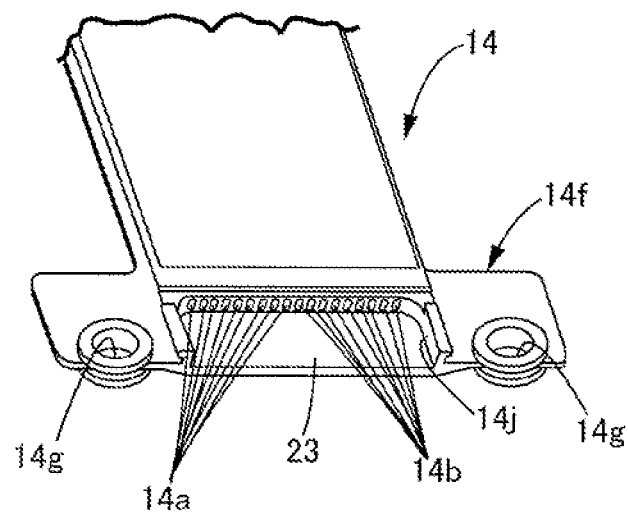
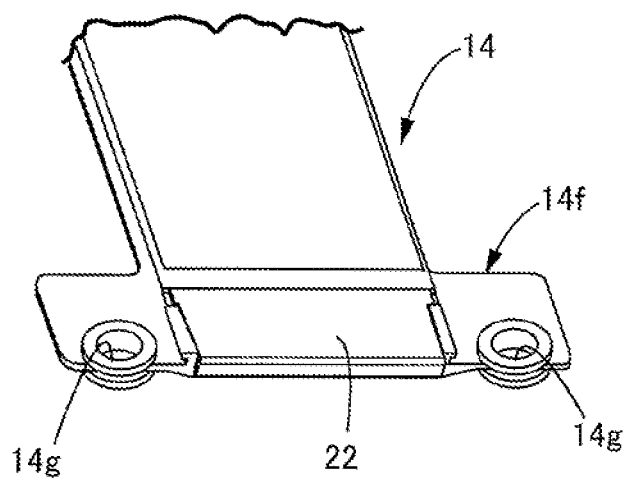

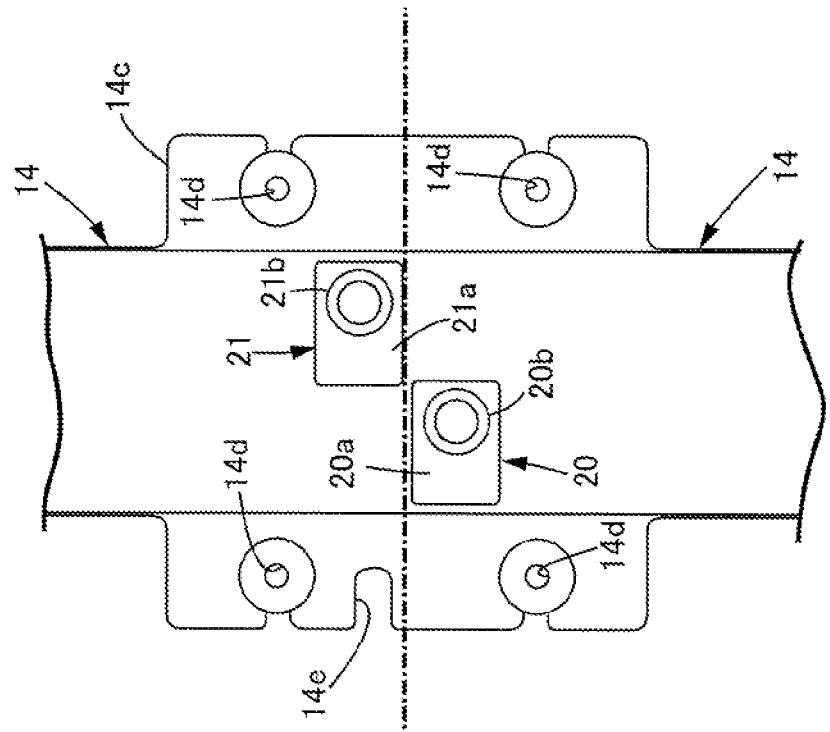
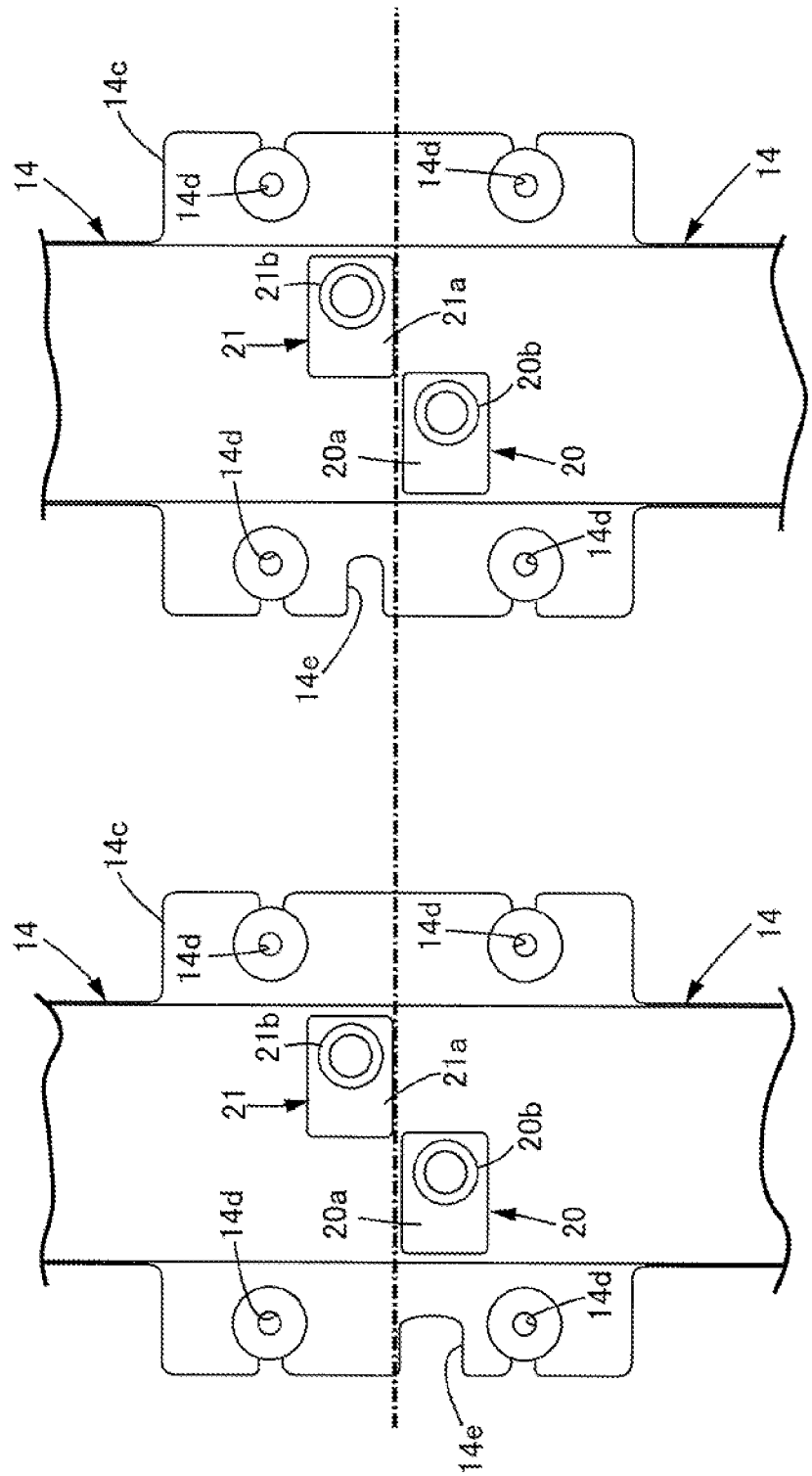

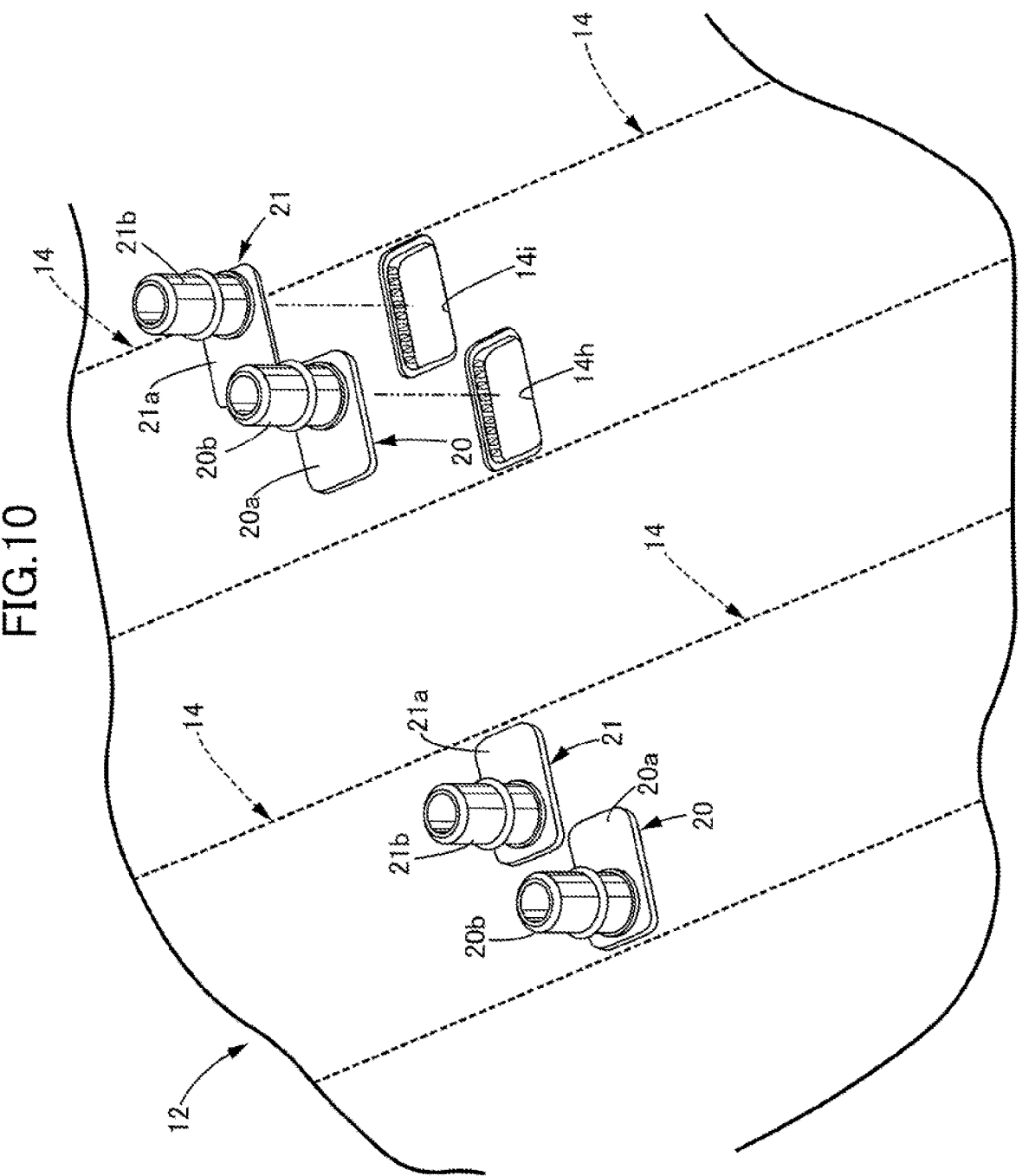

BATTERY COOLING DEVICE FOR ELECTRIC VEHICLE

BACKGROUND OF THE INVENTION

Field of the Invention

The present invention relates to a battery cooling device for an electric vehicle comprising a battery that is for driving the electric vehicle, a cooling member that has in an interior thereof a cooling medium passage, a cooling medium supply piping that supplies cooling medium to the cooling member, and a cooling medium discharge piping that discharges cooling medium from the cooling member. The present invention also relates to a battery cooling device for an electric vehicle comprising a battery that is for driving the electric vehicle, a battery case that supports the battery, a cooling medium jacket that is formed integrally with the battery case and has a cooling medium passage in an interior of the cooling medium jacket, a cooling medium supply piping that supplies cooling medium to the cooling medium jacket, and a cooling medium discharge piping that discharges cooling medium from the cooling medium jacket.

Description of the Related Art

Japanese Patent No. 6064730 has made known an arrangement in which a plurality of panels (water jackets) are disposed on the bottom of a battery pack of an electric vehicle along the fore-and-aft direction of a vehicle body, a cooling medium supply passage is provided along one side edge in the vehicle width direction of the panels, a cooling medium discharge passage is provided along the other side edge in the vehicle width direction, the cooling medium supply passage and the cooling medium discharge passage are connected by means of a cooling passage meandering in a zig-zag manner, and the battery is cooled by cooling medium flowing from the cooling medium supply passage to the cooling medium discharge passage via the cooling passage.

In the above conventional arrangement, since the cooling medium supply passage and the cooling medium discharge passage, in which the flow rate of cooling medium is large, are disposed in the fore-and-aft direction along two side edges in the vehicle width direction of the panel, when an automobile is involved in a side collision the cooling medium supply passage or the cooling medium discharge passage can easily be damaged, and there is a possibility that the cooling medium will leak. Furthermore, while cooling medium is flowing through the cooling passage from the upstream side to the downstream side it carries out heat exchange with a high temperature battery, and its temperature gradually increases; in the above conventional arrangement, since cooling medium flows through the cooling passage of the panel from one side to the other side in the vehicle width direction, the temperature of the cooling medium varies between said one side and said other side in the vehicle width direction, thus giving rise to the possibility that the cooling of the battery will become uneven.

SUMMARY OF THE INVENTION

The present invention has been accomplished in light of the above circumstances, and it is an object thereof to provide a battery cooling device for an electric vehicle for which it is easy to protect cooling medium supply piping and cooling medium discharge piping when involved in a side collision and for which it is possible to evenly cool a battery.

In order to achieve the object, according to a first aspect of the present invention, there is provided a battery cooling device for an electric vehicle comprising a battery that is for driving the electric vehicle, a cooling member that has in an interior thereof a cooling medium passage, a cooling medium supply piping that supplies cooling medium to the cooling member, and a cooling medium discharge piping that discharges cooling medium from the cooling member, wherein the cooling medium supply piping and the cooling medium discharge piping are disposed in a fore-and-aft direction in a middle part in a vehicle width direction of a vehicle body, a plurality of cooling members as said cooling member extend toward opposite sides in the vehicle width direction from the cooling medium supply piping and the cooling medium discharge piping, and the cooling medium passage returns in an outer end part in the vehicle width direction of the cooling member.

In accordance with the first aspect, the battery cooling device for an electric vehicle includes the battery for driving the electric vehicle, the cooling member having the cooling medium passage in the interior, the cooling medium supply piping supplying cooling medium to the cooling member, and the cooling medium discharge piping discharging cooling medium from the cooling member. Since the cooling medium supply piping and the cooling medium discharge piping are disposed in the fore-and-aft direction in the middle part in the vehicle width direction of the vehicle body, the plurality of cooling members extend from the cooling medium supply piping and the cooling medium discharge piping toward opposite sides in the vehicle width direction, and the cooling medium passage returns in the outer end part in the vehicle width direction of the cooling member, when the vehicle is involved in a side collision it becomes difficult for the cooling medium supply piping and the cooling medium discharge piping disposed in the fore-and-aft direction in the middle part in the vehicle width direction to be damaged, and not only is the cooling medium prevented from leaking, but the cooling medium also flows by making a U-turn in the interior of the cooling member, thereby enabling a position on the outside in the vehicle width direction of the battery and a position on the inside in the vehicle width direction to be cooled evenly.

According to a second aspect of the present invention, in addition to the first aspect, two of the cooling members, which extend toward opposite sides in the vehicle width direction from the middle part in the vehicle width direction, are formed as a unit, and the two cooling members comprise a common cooling medium inlet and a common cooling medium outlet.

In accordance with the second aspect, since the two cooling members extending from the middle part in the vehicle width direction toward opposite sides in the vehicle width direction are formed as a unit, and the two cooling members include the common cooling medium inlet and the common cooling medium outlet, not only is the structure simplified compared with a case in which a plurality of cooling medium inlets and a plurality of cooling medium outlets are provided, but it is also possible to make the amount of cooling medium supplied to the two cooling members uniform.

According to a third aspect of the present invention, in addition to the second aspect, with regard to the plurality of cooling members there are two or more types of diameters for the cooling medium inlet.

In accordance with the third aspect, since with regard to the plurality of cooling members there are two or more types of diameters for the cooling medium inlet, it is possible to preset the amount of cooling medium supplied to each cooling member.

According to a fourth aspect of the present invention, in addition to the third aspect, a diameter of the cooling medium inlet connected to an upstream side of the cooling medium supply piping is smaller than a diameter of the cooling medium inlet connected to a downstream side of the cooling medium supply piping.

In accordance with the fourth aspect, since the diameter of the cooling medium inlet connected to the upstream side of the cooling medium supply piping is smaller than the diameter of the cooling medium inlet connected to the downstream side, it is possible to make the amounts of cooling medium supplied to the cooling member on the upstream side and the cooling member on the downstream side uniform.

According to a fifth aspect of the present invention, in addition to the fourth aspect, the cooling member comprises a mounting portion fixed to a battery case, and the cooling members that have different diameters for the cooling medium inlet have different shapes for the mounting portion.

In accordance with the fifth aspect, since the cooling member includes the mounting part fixed to the battery case, and the cooling members having a different diameter for the cooling medium inlet have a different shape for the mounting part, it is possible to avoid a situation in which a cooling member having a different diameter for the cooling medium inlet is assembled at an erroneous position.

According to a sixth aspect of the present invention, there is provided a battery cooling device for an electric vehicle comprising a battery that is for driving the electric vehicle, a battery case that supports the battery, a cooling medium jacket that is formed integrally with the battery case and has a cooling medium passage in an interior of the cooling medium jacket, a cooling medium supply piping that supplies cooling medium to the cooling medium jacket, and a cooling medium discharge piping that discharges cooling medium from the cooling medium jacket, wherein the cooling medium supply piping and the cooling medium discharge piping are disposed in a fore-and-aft direction in a middle part in a vehicle width direction of a vehicle body, a plurality of cooling medium jackets as said cooling medium jacket extend toward opposite sides in the vehicle width direction from the cooling medium supply piping and the cooling medium discharge piping, and the cooling medium passage returns in an outer end part in the vehicle width direction of the cooling medium jacket.

In accordance with the sixth aspect, the battery cooling device for an electric vehicle includes the battery for driving the electric vehicle, the battery case supporting the battery, the cooling medium jacket formed integrally with the battery case and having the cooling medium passage in the interior, the cooling medium supply piping supplying cooling medium to the cooling medium jacket, and the cooling medium discharge piping discharging cooling medium from the cooling medium jacket. Since the cooling medium supply piping and the cooling medium discharge piping are disposed in the fore-and-aft direction in the middle part in the vehicle width direction of the vehicle body, the plurality of cooling medium jackets extend from the cooling medium supply piping and the cooling medium discharge piping toward opposite sides in the vehicle width direction, and the cooling medium passage returns in the outer end part in the vehicle width direction of the cooling medium jacket, when the vehicle is involved in a side collision it becomes difficult for the cooling medium supply piping and the cooling medium discharge piping disposed in the fore-and-aft direction in the middle part in the vehicle width direction to be damaged, and not only is the cooling medium prevented from leaking, but the cooling medium also flows by making a U-turn in the interior of the cooling medium jacket, thereby enabling a position on the outside in the vehicle width direction of the battery and a position on the inside in the vehicle width direction to be cooled evenly.

According to a seventh aspect of the present invention, in addition to the sixth aspect, two of the cooling medium jackets, which extend toward opposite sides in the vehicle width direction from the middle part in the vehicle width direction, are formed as a unit, and the two cooling medium jackets comprise a common cooling medium inlet and a common cooling medium outlet.

In accordance with the seventh aspect, since the two cooling medium jackets extending from the middle part in the vehicle width direction toward opposite sides in the vehicle width direction are formed as a unit, and the two cooling medium jackets include the common cooling medium inlet and the common cooling medium outlet, not only is the structure simplified compared with a case in which a plurality of cooling medium inlets and a plurality of cooling medium outlets are provided, but it is also possible to make the amount of cooling medium supplied to the two cooling medium jackets uniform.

According to an eighth aspect of the present invention, in addition to the seventh aspect, with regard to the plurality of cooling medium jackets there are two or more types of diameters for the cooling medium inlet.

In accordance with the eighth aspect, since with regard to the plurality of cooling medium jackets there are two or more types of diameters for the cooling medium inlet, it is possible to preset the amount of cooling medium supplied to each cooling medium jacket.

According to a ninth aspect of the present invention, in addition to the eighth aspect, a diameter of the cooling medium inlet connected to an upstream side of the cooling medium supply piping is smaller than a diameter of the cooling medium inlet connected to a downstream side of the cooling medium supply piping.

In accordance with the ninth, since the diameter of the cooling medium inlet connected to the upstream side of the cooling medium supply piping is smaller than the diameter of the cooling medium inlet connected to the downstream side, it is possible to make the amounts of cooling medium supplied to the cooling medium jacket on the upstream side and the cooling medium jacket on the downstream side uniform.

Note that a battery module 13 of embodiments corresponds to the battery of the present invention, a cooling medium jacket 14 of the embodiments corresponds to the cooling member of the present invention, and a cooling medium supply passage 14a and a cooling medium discharge passage 14b of the embodiments correspond to the cooling medium passage of the present invention.

The above and other objects, characteristics and advantages of the present invention will be clear from detailed descriptions of the preferred embodiments which will be provided below while referring to the attached drawings.

BRIEF DESCRIPTION OF THE DRAWINGS

FIG. 6 shows views in the direction of arrow 6 in FIG. 2 (first embodiment).

FIGS. 8A and 8B are diagrams showing the shape of a cutout of a mounting part of a cooling medium jacket (first embodiment).

FIG. 10 is a diagram corresponding to FIG. 7 (third embodiment).

DESCRIPTION OF THE PREFERRED EMBODIMENTS

First Embodiment

Embodiments of the present invention are explained below by reference to FIG. 1 to FIGS. 8A and 8B. The fore-and-aft direction, the left-and-right direction (vehicle width direction), and the up-and-down direction in the Specification are on the basis of a vehicle body.

Figure 1:
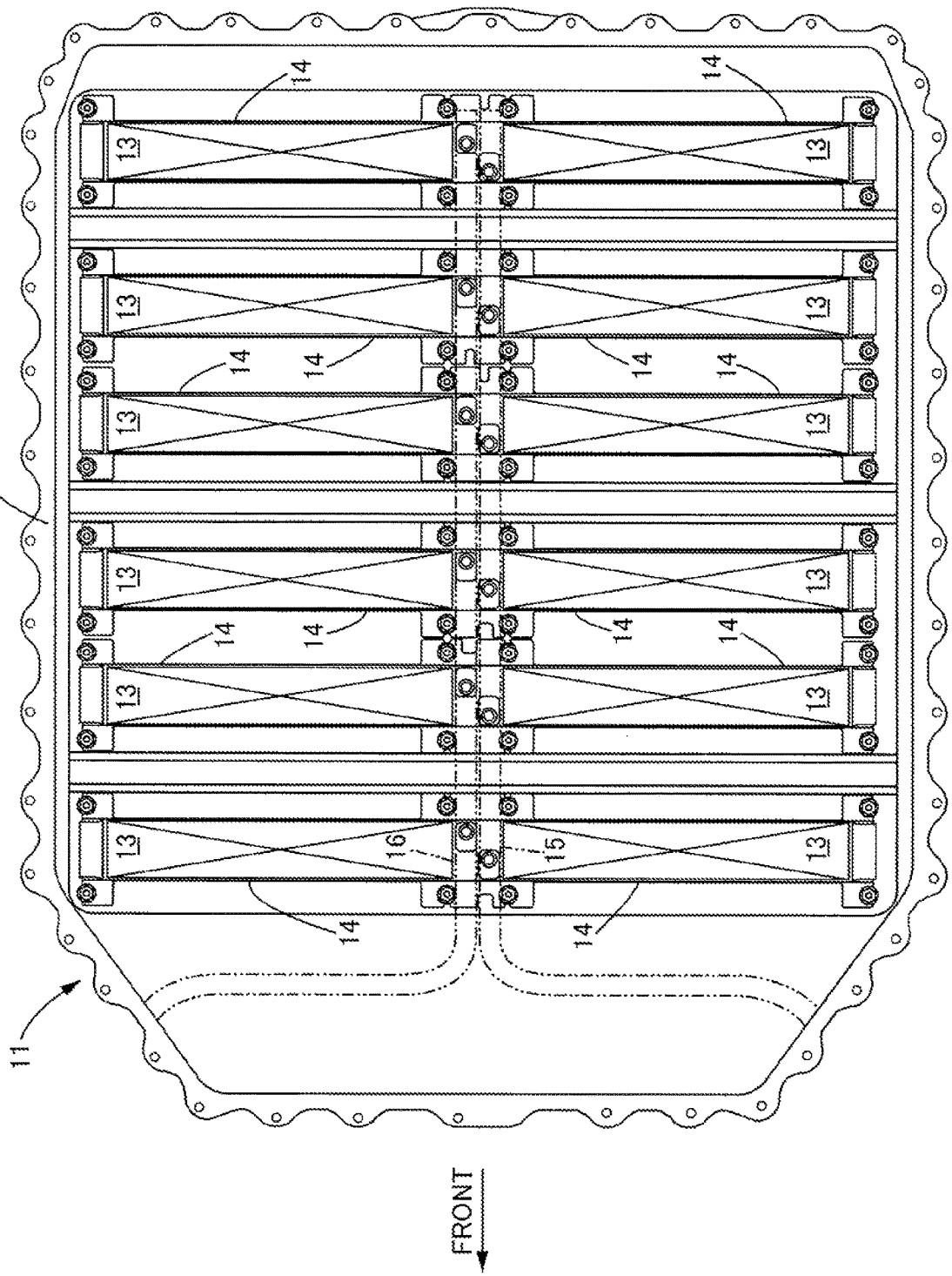
FIG. 1 is a plan view of a battery case (first embodiment).

As shown in FIG. 1, a battery pack 11 mounted under a floor of a vehicle compartment of an electric vehicle includes a tray-shaped battery case 12, and twelve battery modules 13 are housed in the interior of the battery case 12. Each battery module 13, which has a rectangular parallelepiped shape, is formed by layering a plurality of battery cells and fastening them as a unit, and six of the battery modules 13 on each of the left and the right are disposed to form two lines that are symmetrical with respect to the center line of the battery case 12. An opening in an upper face of the battery case 12 is covered by a cover, which is not illustrated.

Figure 2:
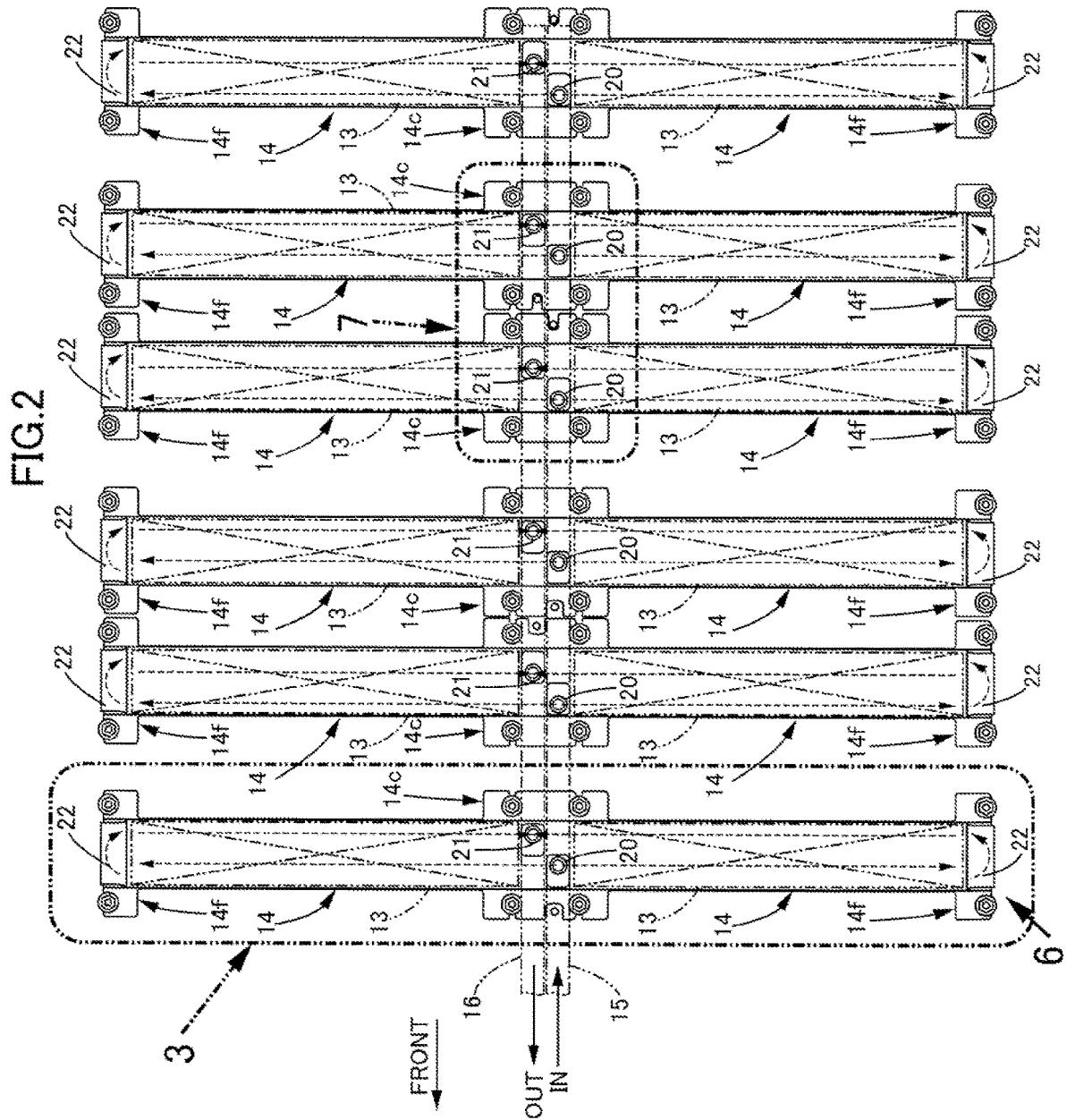
FIG. 2 is an enlarged view of an essential part of FIG. 1 (first embodiment).
Figure 3:
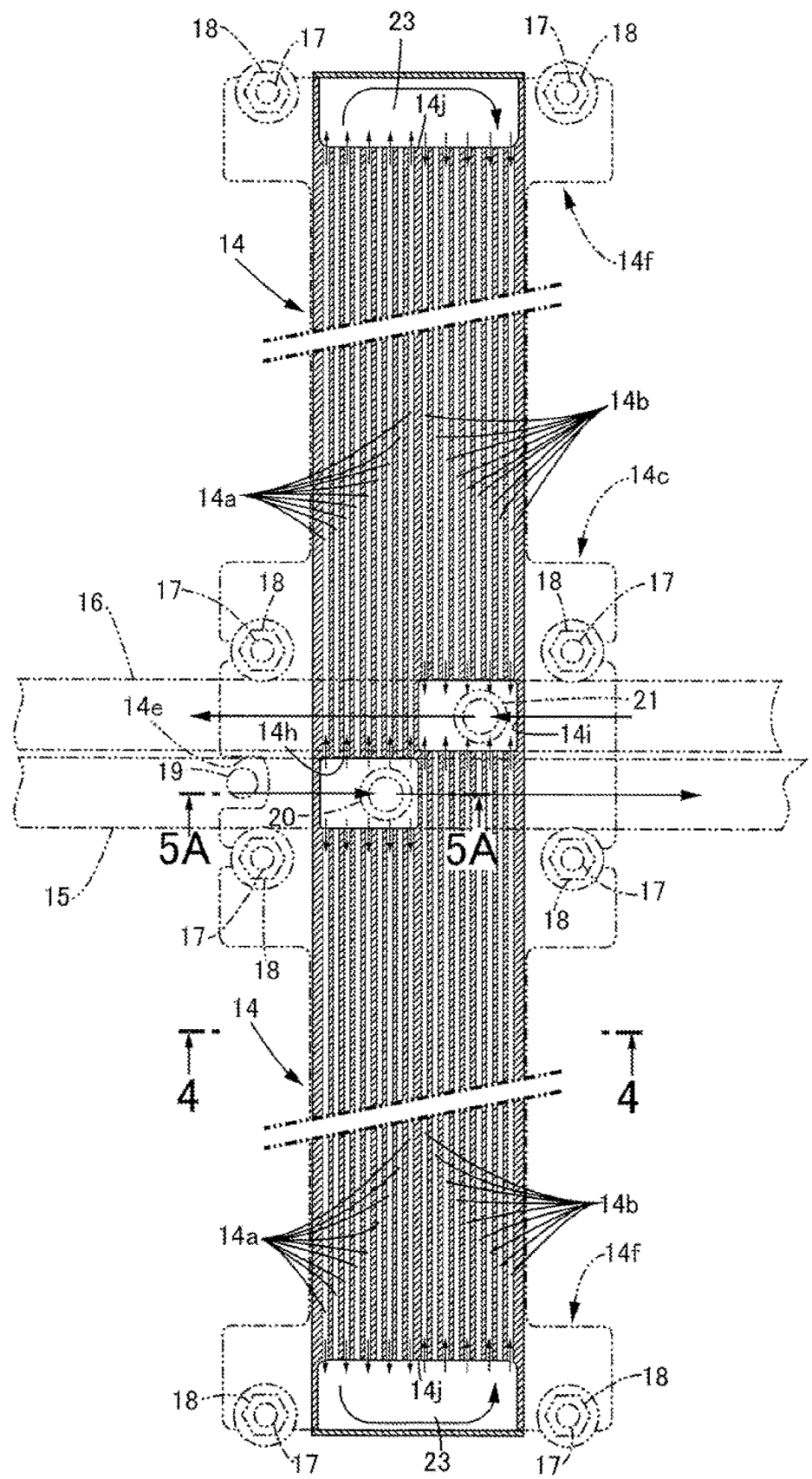
FIG. 3 is an enlarged view of part 3 in FIG. 2 (first embodiment).
Figure 4:
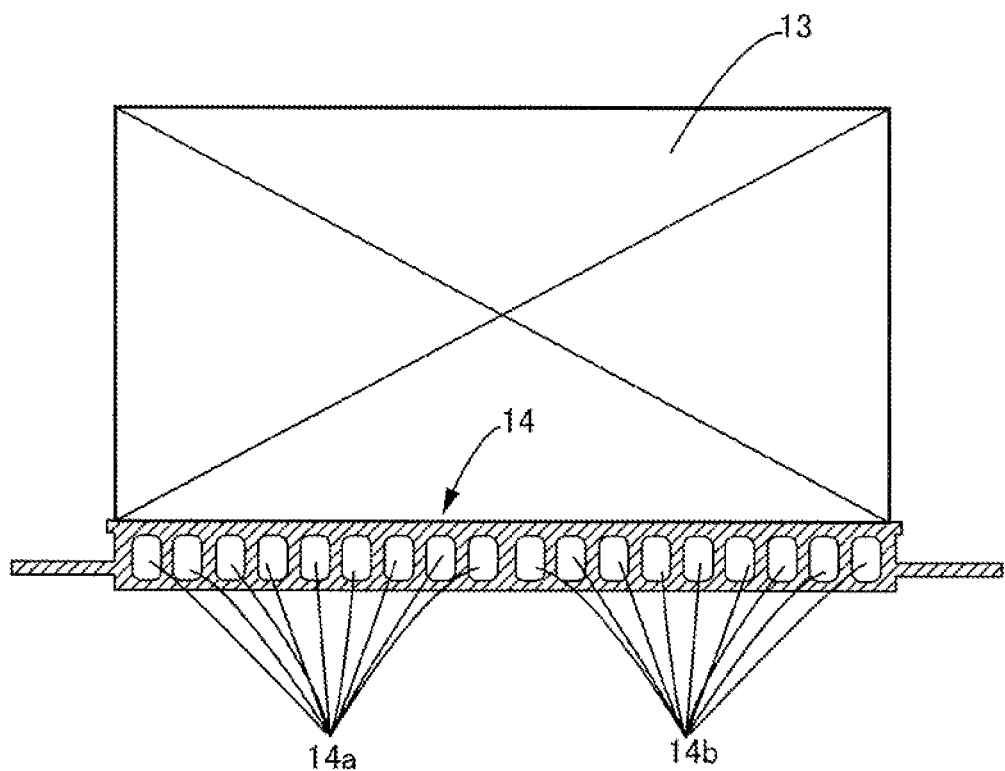
FIG. 4 is a sectional view along line 4-4 in FIG. 3 (first embodiment).

As shown in FIG. 2, twelve cooling medium jackets 14 for cooling the battery modules 13 are disposed on a bottom wall of the battery case 12 side by side as two, that is, left and right, lines with their longitudinal direction along the vehicle width direction, and one battery module 13 is disposed on each of the cooling medium jackets 14. A cooling medium supply piping 15 and a cooling medium discharge piping 16 are disposed in parallel with each other along the center line of the battery case 12, and an inner end part in the vehicle width direction of the cooling medium jacket 14 is connected to the cooling medium supply piping 15 and the cooling medium discharge piping 16. The six pairs of cooling medium jackets 14 have a basically identical structure apart from the details, and the structure of one thereof is explained below as an example.

As shown in FIG. 3 to FIG. 7, the pair of left and right cooling medium jackets 14 are formed as a unit; 18 cooling medium passages are formed in parallel with each other along the vehicle width direction in the interior of a main body part formed from a rectangular metal plate, nine thereof on the front side are cooling medium supply passages 14a, and nine thereof on the rear side are cooling medium discharge passages 14b. A plate-shaped mounting portion 14c protrudes in the fore-and-aft direction from a middle part in the vehicle width direction of the cooling medium jackets 14, two mounting holes 14d are formed in each of front and rear sides of the mounting portion 14c (see FIG. 7), and one U-shaped cutout 14e is formed in one of the front and rear sides of the mounting portion 14c. Furthermore, a plate-shaped mounting portion 14f protrudes in the fore-and-aft direction from an outer end part in the vehicle width direction of the cooling medium jackets 14, and two mounting holes 14g are formed in the mounting portion 14f (see FIG. 6).

A plurality of stud bolts 17 are provided on the bottom wall of the battery case 12 so as to project upward, and fitting these stud bolts 17 into the mounting holes 14d, 14g of the cooling medium jackets 14 and fastening with nuts 18 fixes the cooling medium jackets 14 to the bottom wall of the battery case 12. In this process, an erroneous assembly-preventing pin 19 projecting upward from the bottom wall of the battery case 12 is fitted into a cutout 14e formed in the mounting portion 14c of the cooling medium jackets 14.

Two elliptical openings 14h, 14i are formed in upper faces of middle parts in the vehicle width direction of the pair of cooling medium jackets 14, the opening 14h on the front side communicates with the nine cooling medium supply passages 14a, and the opening 14i on the rear side communicates with the nine cooling medium discharge passages 14b. A nipple-shaped cooling medium inlet 20 includes a plate-shaped blocking portion 20a and a tubular linking portion 20b, and in a state in which the blocking portion 20a is fixed to the peripheral edge of the opening 14h the linking portion 20b is connected to the cooling medium supply piping 15. Furthermore, a nipple-shaped cooling medium outlet 21 includes a plate-shaped blocking portion 21a and a tubular linking portion 21b, and in a state in which the blocking portion 21a is fixed to the peripheral edge of the opening 14i the linking portion 21b is connected to the cooling medium discharge piping 16.

An opening 14j is formed in an upper face of an end part in the vehicle width direction of the cooling medium jacket 14, and the nine cooling medium supply passages 14a and the nine cooling medium discharge passages 14b open in the opening 14j. Fixing a cover member 22 with an L-shaped cross section so as to cover the opening 14j of the cooling medium jacket 14 defines a communication chamber 23 between the cooling medium jacket 14 and the cover member 22, and the nine cooling medium supply passages 14a and the nine cooling medium discharge passages 14b are made to communicate with each other via the communication chamber 23.

Among the six pairs of cooling medium jackets 14, three pairs of cooling medium jackets 14 on the upstream side of the cooling medium supply piping 15 (that is, on the front side) and three pairs of cooling medium jackets 14 on the downstream side of the cooling medium supply piping 15 (that is, on the rear side) have slightly different structures.

Figure 5A:
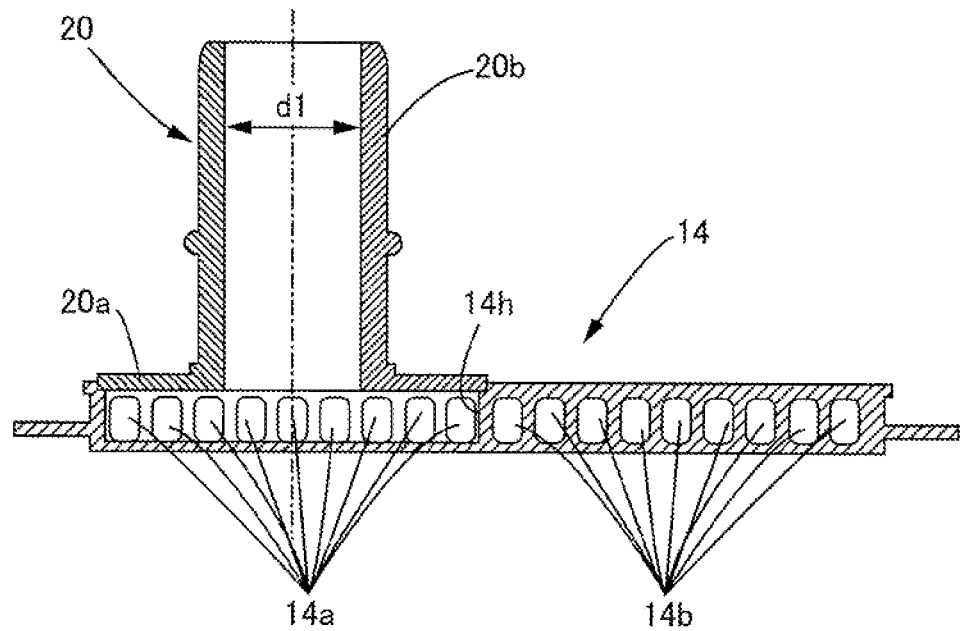
FIGS. 5A and 5B are sectional views along line 5A-5A in FIG. 3 (first embodiment).
Figure 5B:
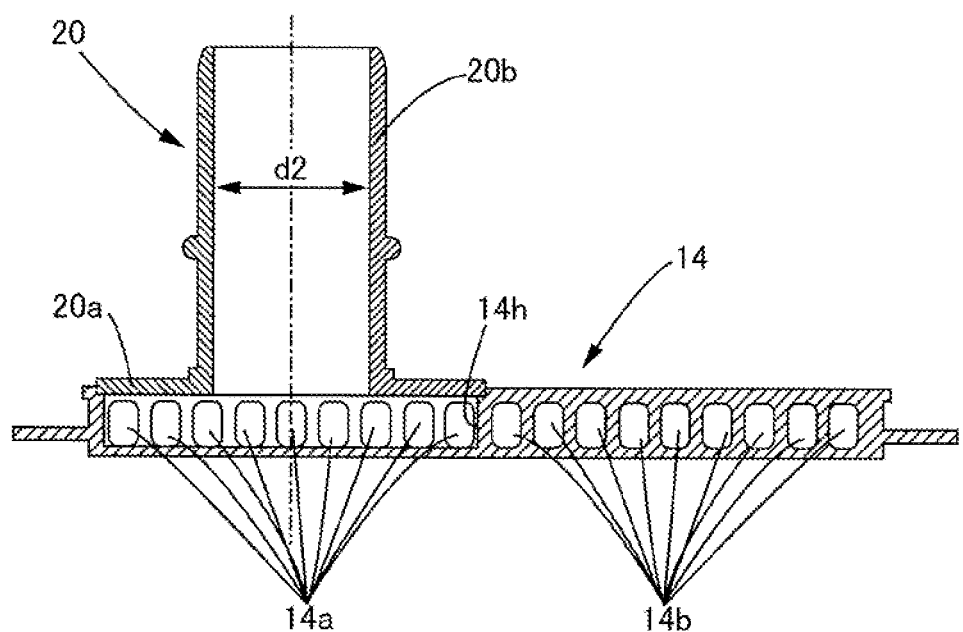
Figure 7:
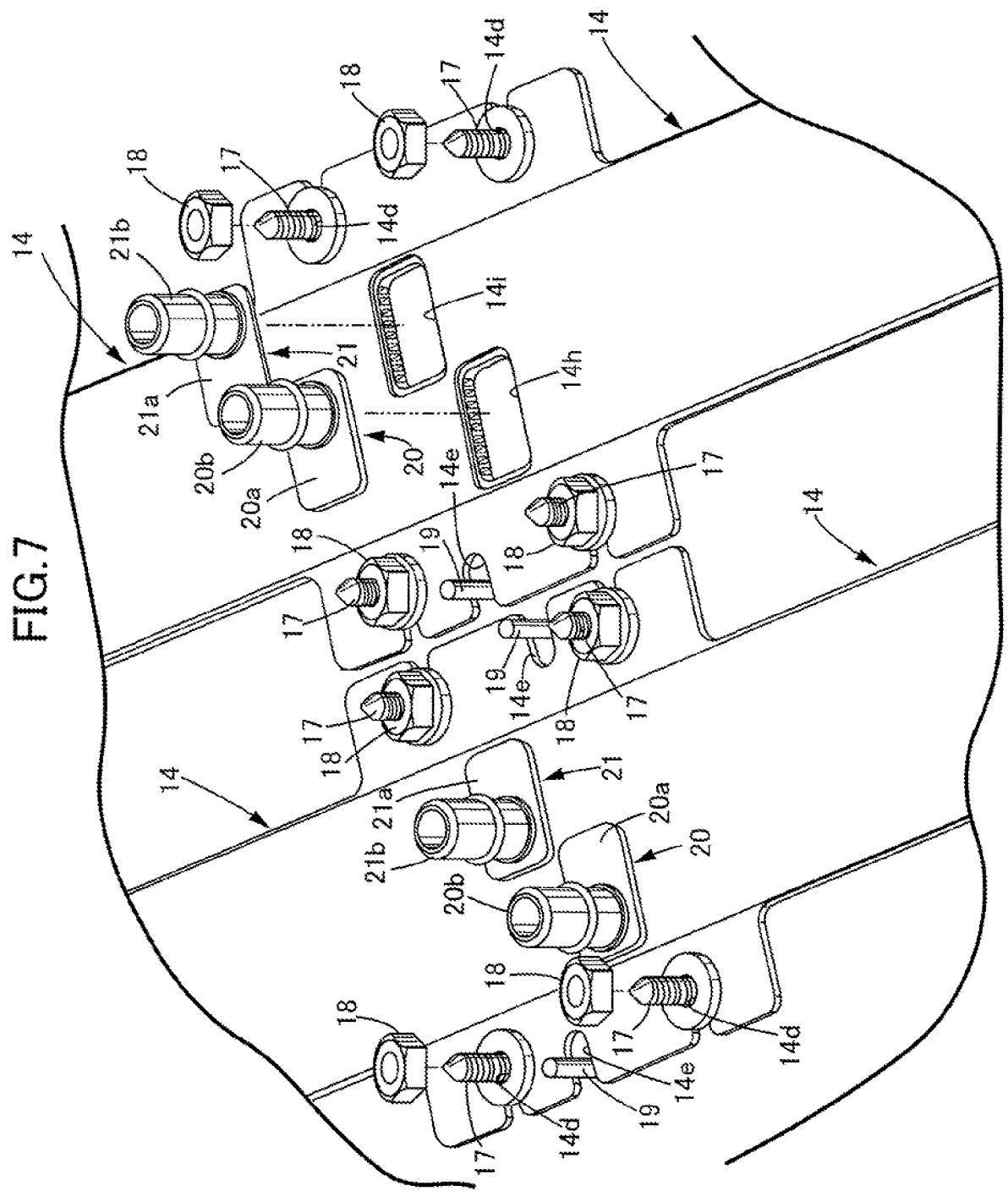
FIG. 7 is a perspective view of part 7 in FIG. 2 (first embodiment).

As shown in FIGS. 5A and 5B, an internal diameter d1 of the cooling medium inlet 20 of the three pairs of cooling medium jackets 14 on the front side is set to be smaller than an internal diameter d2 of the cooling medium inlet 20 of the three pairs of cooling medium jackets 14 on the rear side. Similarly, with regard to the three pairs of cooling medium jackets 14 on the front side, an internal diameter d1 of the cooling medium outlet 21 thereof is set to be smaller than an internal diameter d2 of the cooling medium outlet 21 of the three pairs of cooling medium jackets 14 on the rear side. Furthermore, as is clear from FIG. 2 and FIGS. 8A and 8B, with regard to the three pairs of cooling medium jackets 14 on the front side and the three pairs of cooling medium jackets 14 on the rear side, the position and the size of the cutouts 14e of the mounting portions 14c in the middle in the vehicle width direction are different.

The pair of cooling medium jackets 14 can be used with their left and right sides reversed, and in this case the cooling medium inlet 20 and the cooling medium outlet 21 are exchanged and the cooling medium supply passages 14a and the cooling medium discharge passages 14b are exchanged. In the present embodiment, among the three pairs of cooling medium jackets 14 on the front side the pair of cooling medium jacket 14 in the middle in the fore-and-aft direction are flipped horizontally with respect to the other two pairs of cooling medium jackets 14, and among the three pairs of cooling medium jackets 14 on the rear side the pair of cooling medium jacket 14 in the middle in the fore-and-aft direction are flipped horizontally with respect to the other two pairs of cooling medium jackets 14.

The operation of an embodiment of the present invention having the above arrangement is now explained.

Cooling medium supplied from the cooling medium supply piping 15 branches from the cooling medium inlet 20 of the pair of cooling medium jackets 14 positioned at the frontmost position toward the cooling medium supply passages 14a on the left and right sides, flows outward in the vehicle width direction, makes a U-turn in the communication chambers 23, flows inward in the vehicle width direction in the cooling medium discharge passages 14b on the left and right sides, is combined in the cooling medium outlet 21, and is returned to the cooling medium discharge piping 16. In this way, when the left and right cooling medium jackets 14 are cooled with cooling medium, the left and right battery modules 13 placed on the upper face thereof carry out heat exchange with the cooling medium jackets 14 and are cooled. Similarly, cooling medium is supplied to the second pair to the sixth pair of cooling medium jackets 14, and the remaining battery modules 13 placed on the upper face thereof are cooled.

Since cooling medium is supplied to the cooling medium supply piping 15, which is disposed in the fore-and-aft direction, from the front to the rear, cooling medium is easily supplied to the cooling medium jackets 14 connected to the upstream side of the cooling medium supply piping 15, and it is difficult for cooling medium to be supplied to the cooling medium jackets 14 connected to the downstream side of the cooling medium supply piping 15; in the present embodiment, since the internal diameter d1 of the cooling medium inlets 20 and the cooling medium outlets 21 of the three pairs of cooling medium jackets 14 on the upstream side is set to be small, and the internal diameter d2 of the cooling medium inlets 20 and the cooling medium outlets 21 of the three pairs of cooling medium jackets 14 on the downstream side is set to be large, it is possible by making the amount of cooling medium supplied to the six pairs of cooling medium jackets 14 uniform to evenly cool all of the battery modules 13.

Furthermore, since the temperature of cooling medium flowing through the interior of each cooling medium jacket 14 is the lowest at the cooling medium inlet 20, gradually increases as a result of heat exchange with the battery module 13 while cooling medium flows through the cooling medium supply passages 14a and the cooling medium discharge passages 14b, and is the highest at the cooling medium outlet 21, there is a possibility that the bottom of the battery module 13 that is in contact with the cooling medium jacket 14 will be cooled unevenly.

However, in accordance with the present embodiment, since the downstream end of the cooling medium supply passages 14a makes a U-turn in the communication chamber 23 and is connected to the upstream end of the cooling medium discharge passages 14b, the inner end side in the vehicle width direction of the battery module 13 is cooled with low temperature cooling medium on the upstream side of the cooling medium supply passages 14a and high temperature cooling medium on the downstream side of the cooling medium discharge passages 14b, and the outer end side in the vehicle width direction of the battery module 13 is cooled with an intermediate temperature cooling medium on the downstream side of the cooling medium supply passages 14a and an intermediate temperature cooling medium on the upstream side of the cooling medium discharge passages 14b; as a result, each part in the vehicle width direction of the battery module 13 can be cooled evenly, thereby preventing a difference in temperature from occurring.

Moreover, since the pair of cooling medium jackets 14 include the cooling medium inlet 20 and the cooling medium outlet 21 in the middle part in the vehicle width direction, and the battery module 13 on the left side and the battery module 13 on the right side are cooled with cooling medium supplied and discharged from the cooling medium inlet 20 and the cooling medium outlet 21, compared with a case in which each cooling medium jacket 14 is provided with the cooling medium inlet 20 and the cooling medium outlet 21, not only can the structure be simplified, but it is also possible to evenly cool the left and right battery modules 13 by making the flow rate of cooling medium supplied to each of the pair of cooling medium jackets 14 uniform.

As described above, among the six pairs of cooling medium jackets 14, since the three pairs of cooling medium jackets 14 on the front side and the three pairs of cooling medium jackets 14 on the rear side have different internal diameters for the cooling medium inlets 20 and the cooling medium outlets 21, when they are mounted on the bottom wall of the battery case 12 of the battery pack 11, there is a possibility that erroneous assembly will occur.

However, in accordance with the present embodiment, as shown in FIGS. 8A and 8B, since with regard to the three pairs of cooling medium jackets 14 on the front side and the three pairs of cooling medium jackets 14 on the rear side the positions of the cutouts 14e provided in the mounting portions 14c are different, if an attempt is made to erroneously assemble the pair of cooling medium jackets 14 on the front side at the position for the pair of cooling medium jackets 14 on the rear side or if an attempt is made to erroneously assemble the pair of cooling medium jackets 14 on the rear side at the position for the pair of cooling medium jackets 14 on the front side, the erroneous assembly-preventing pin 19 provided on the battery case 12 will not fit into the cutout 14e, thus making it possible to reliably prevent an erroneous assembly from occurring.

Second Embodiment

Figure 9:
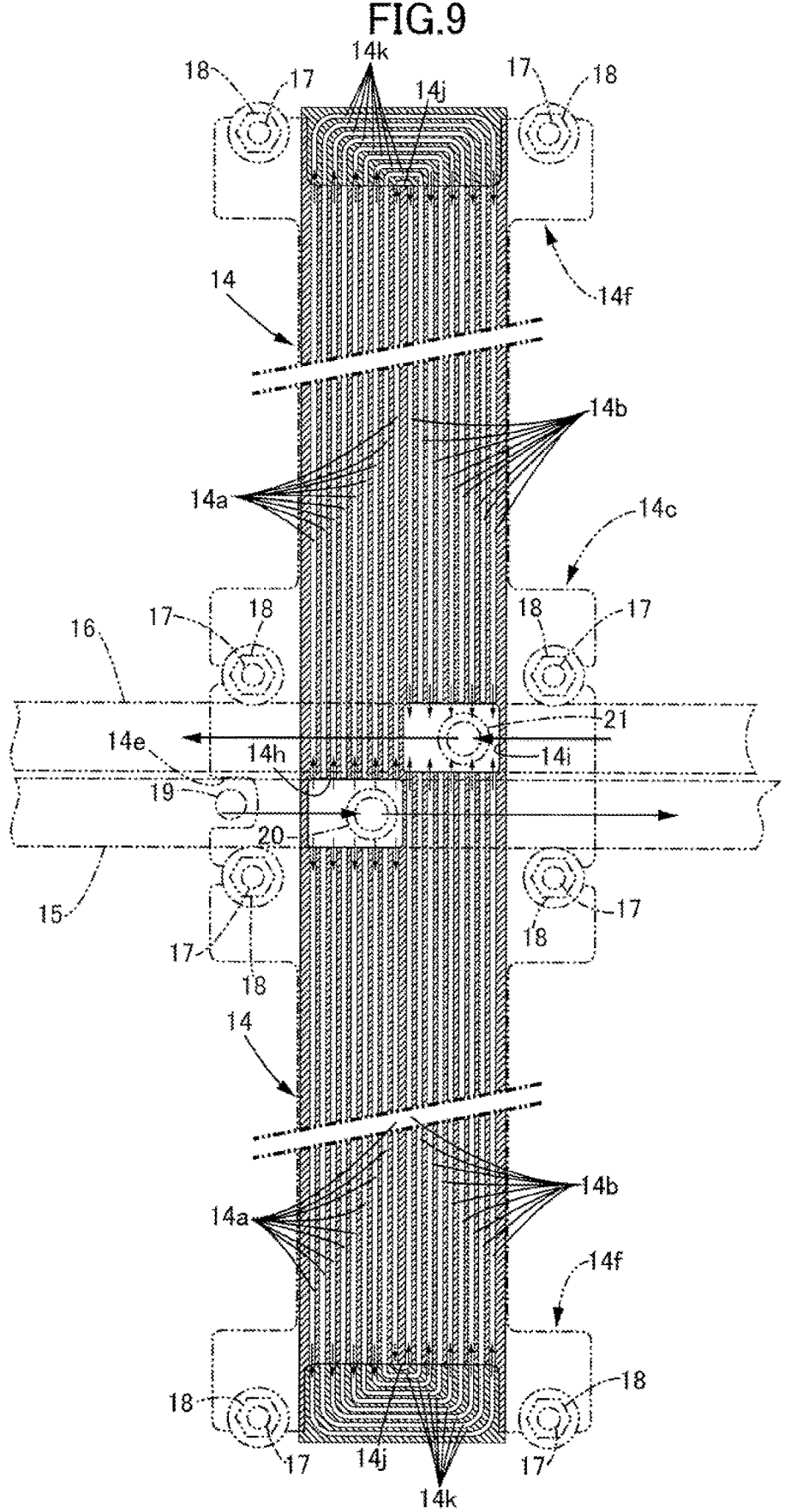
FIG. 9 is a diagram corresponding to FIG. 3 (second embodiment).

A second embodiment of the present invention is now explained by reference to FIG. 9.

In the first embodiment, the downstream end of the cooling medium supply passages 14a of the cooling medium jacket 14 and the upstream end of the cooling medium discharge passages 14b are made to communicate with each other all at once via the communication chamber 23 formed in the interior of the cover member 22, but in the second embodiment the downstream end of the cooling medium supply passages 14a of the cooling medium jacket 14 and the upstream end of the cooling medium discharge passages 14b are made to communicate with each other individually via nine linking passages 14k formed from a U-shaped groove formed in the interior of the cover member 22.

In accordance with the present embodiment, cooling medium does not form a vortex in the communication chamber 23, thus enabling the cooling medium to make a smooth U-turn.

Third Embodiment

A third embodiment of the present invention is now explained by reference to FIG. 10.

In the first embodiment, the cooling medium jackets 14 formed as separate members are mounted on the bottom wall of the battery case 12 of the battery pack 11, but in the third embodiment the cooling medium jackets 14 are formed integrally with the bottom wall of the battery case 12.

In the present embodiment, it becomes unnecessary to use the stud bolts 17, the nuts 18, the mounting portions 14c, the mounting portions 14f, etc. for mounting the cooling medium jackets 14, and not only can the number of components be cut and the structure be simplified, but it is also possible to further cut the number of components and simplify the structure because erroneous assembly does not occur and the erroneous assembly-preventing pins 19 and the cutouts 14e are therefore unnecessary.

Embodiments of the present invention are explained above, but the present invention may be modified in a variety of ways as long as the modifications do not depart from the gist of the present invention.

For example, the embodiments include the twelve cooling medium jackets 14, but there may be any number of cooling medium jackets 14 as long as there are two or more.

Furthermore, in the embodiments there is a large difference in the size of the cutouts 14e between the three pairs of cooling medium jackets 14 on the front side and the three pairs of cooling medium jackets 14 on the rear side, but even when the cutouts 14e have the same size, the function of preventing erroneous assembly is not changed. If the size of the cutouts 14e is different, a worker can differentiate visually between the cooling medium jackets 14 on the front side and the cooling medium jackets 14 on the rear side.

What is claimed is:

1. A battery cooling device for an electric vehicle comprising
a battery that is for driving the electric vehicle,
a cooling member that has in an interior thereof a cooling medium passage,
a cooling medium supply piping that supplies cooling medium to the cooling member, and
a cooling medium discharge piping that discharges cooling medium from the cooling member,
wherein the cooling medium supply piping and the cooling medium discharge piping are disposed in a fore-and-aft direction in a middle part in a vehicle width direction of a vehicle body,
a plurality of cooling members as said cooling member extend toward opposite sides in the vehicle width direction from the cooling medium supply piping and the cooling medium discharge piping,
the cooling medium passage returns in an outer end part in the vehicle width direction of the cooling member,
two of the cooling members, which extend toward opposite sides in the vehicle width direction from the middle part in the vehicle width direction, are formed as a unit,
the two cooling members of the unit comprise a common cooling medium inlet and a common cooling medium outlet,
with regard to the plurality of cooling members, a plurality of cooling medium inlets are provided as the cooling medium inlet, which have two or more types of diameters,
each the cooling member comprises a mounting portion fixed to a battery case, and the cooling members that have different diameters of the cooling medium inlets have their mounting portions of different outer shapes.

2. The battery cooling device for an electric vehicle according to claim 1, wherein the plurality of cooling medium inlets are arranged in the cooling medium supply piping in the fore-and-aft direction and a diameter of one of the cooling medium inlets connected to an upstream side of the cooling medium supply piping is smaller than a diameter of another of the cooling medium inlets connected to a downstream side of the cooling medium supply piping.

3. A battery cooling device for an electric vehicle comprising
a battery that is for driving the electric vehicle,
a battery case that supports the battery,
a cooling medium jacket that is formed integrally with the battery case and has a cooling medium passage in an interior of the cooling medium jacket,
a cooling medium supply piping that supplies cooling medium to the cooling medium jacket, and
a cooling medium discharge piping that discharges cooling medium from the cooling medium jacket,
wherein the cooling medium supply piping and the cooling medium discharge piping are disposed in a fore-and-aft direction in a middle part in a vehicle width direction of a vehicle body,
a plurality of cooling medium jackets as said cooling medium jacket extend toward opposite sides in the vehicle width direction from the cooling medium supply piping and the cooling medium discharge piping,
the cooling medium passage returns in an outer end part in the vehicle width direction of the cooling medium jacket,
two of the cooling medium jackets, which extend toward opposite sides in the vehicle width direction from the middle part in the vehicle width direction, are formed as a unit,
the two cooling medium jackets comprise a common cooling medium inlet and a common cooling medium outlet,
with regard to the plurality of cooling medium jackets, a plurality of cooling medium inlets are provided as the cooling medium inlet, which have two or more types of diameters,
each the cooling member comprises a mounting portion fixed to a battery case, and the cooling members that have different diameters of the cooling medium inlets have their mounting portions of different outer shapes.

4. A battery cooling device for an electric vehicle comprising
a battery that is for driving the electric vehicle,
a plurality of cooling members, each the cooling member having in an interior thereof a plurality of cooling medium supply passages and a plurality of cooling medium discharge passages, the cooling medium supply passages being gathered on one of opposite sides in a for-and-aft direction in the cooling member while the cooling medium discharge passages being gathered in the other of the opposite sides in the for-and-aft direction, a cooling medium supply piping that supplies cooling medium to the cooling members through cooling medium inlets, a cooling medium discharge piping that discharges cooling medium from the cooling members through cooling medium outlets, wherein the cooling medium supply piping and the cooling medium discharge piping are disposed in the fore-and-aft direction in a middle part in a vehicle width direction of a vehicle body, two of the plurality of cooling members are formed as a unit and extend toward opposite sides in the vehicle width direction from the cooling medium supply piping and the cooling medium discharge piping, and the cooling medium inlet for the two cooling members formed as a unit is common to the cooling medium supply passages of the two cooling members and the cooling medium outlet for the two cooling members is common to the cooling medium discharge passages of the two cooling members, the common cooling medium inlet and the common cooling medium outlet being arranged on the one side and the other side of opposite sides in the fore-and-aft direction, respectively, and arranged offset from each other in the vehicle width direction.

* * * * *